United States Patent [19]

Flider

[11] Patent Number: 4,458,711

[45] Date of Patent: Jul. 10, 1984

[54] VENT VALVE

[75] Inventor: Frank S. Flider, Mattoon, Ill.

[73] Assignee: Justrite Manufacturing Company, Mattoon, Ill.

[21] Appl. No.: 401,520

[22] Filed: Jul. 26, 1982

Related U.S. Application Data

[63] Continuation-in-part of Ser. No. 239,320, Mar. 2, 1981, abandoned.

[51] Int. Cl.³ .................... F16K 17/196; F16K 17/38
[52] U.S. Cl. ........................................ 137/71; 137/73; 137/493.2; 137/846; 220/201; 220/203
[58] Field of Search .............................. 137/493–493.9, 137/846, 71, 73, 70; 220/203, 204, 209, 207, 201

[56] References Cited

U.S. PATENT DOCUMENTS

| | | | |
|---|---|---|---|
| 1,140,713 | 5/1915 | Price | 137/493.2 |
| 1,310,240 | 7/1919 | Kessler | 137/493.3 X |
| 1,740,420 | 12/1929 | Friedman | 137/71 |
| 2,271,786 | 2/1942 | Watkins | 137/73 |
| 2,431,457 | 11/1947 | Bondurant | 137/493.2 |
| 3,463,346 | 8/1969 | Mitchell | 220/203 |
| 3,603,343 | 9/1971 | Keller | 137/493.6 |
| 3,971,406 | 7/1976 | Inada | 137/493.4 |
| 3,976,096 | 8/1976 | Kass | 137/493.2 |
| 4,016,904 | 4/1977 | Gordon | 137/493.9 |

FOREIGN PATENT DOCUMENTS 355948   1/1905   France .................... 137/493.4

*Primary Examiner*—Robert G. Nilson
*Attorney, Agent, or Firm*—Irwin C. Alter

[57] ABSTRACT

A plastic vent valve apparatus for use in connection with storage containers provides for equalization of the internal pressure of the container. Air is admitted into the container in response to a partial vacuum, while fumes or fluid contents of the container are expelled in response to over-pressurization of the container to prevent explosion of the container. Moderate over-pressurization resulting from normal expansion of the contents is relieved by venting of the fumes or liquid contents by means of a valve mechanism. Severe over-pressurization requiring rapid venting is better accommodated by ejection of a thin-walled break-away portion of the upper housing defining a large unobstructed vent aperture. Finally, under severe fire conditions the melting of the plastic valve components may provide a yet larger aperture for maximum venting.

9 Claims, 14 Drawing Figures

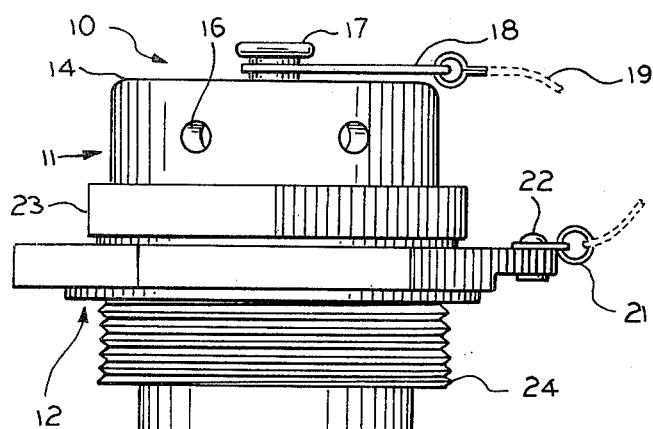
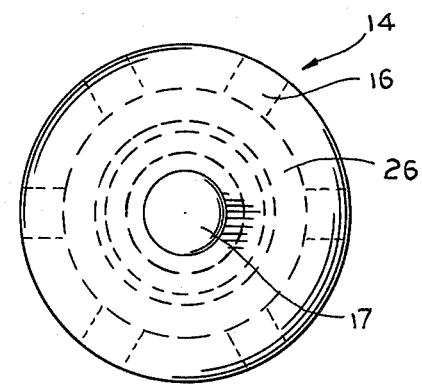
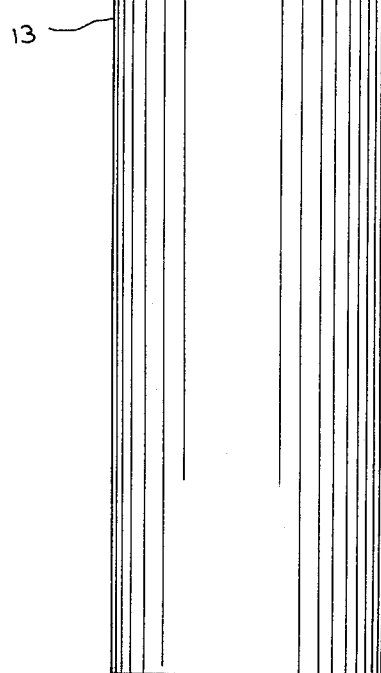
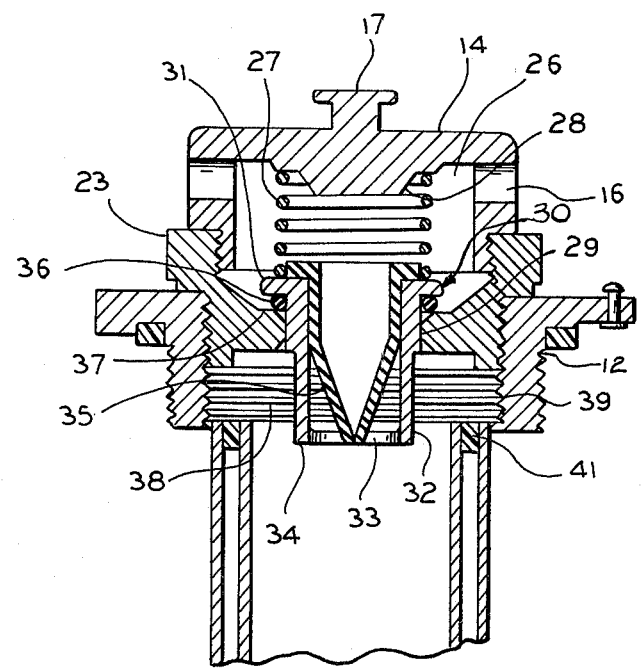
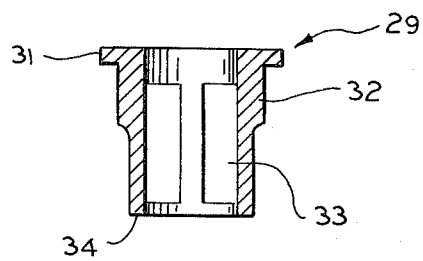
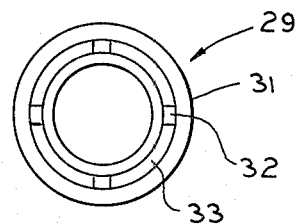
FIG.1
FIG.2
FIG.3
FIG.4
FIG.5

VENT VALVE

BACKGROUND OF THE INVENTION

This is a Continuation-In-Part application from my earlier filed parent application Ser. No. 06/239,320, filed Mar. 2, 1981, now abandoned.

The present invention relates in general to valves, and particularly to an improved vent valve apparatus for venting fluid containers.

It has always been necessary for either automatic or manual venting of fluid containers as a safety precaution, in order to avoid the situation where the internal fluid pressure within the container far exceeds the atmospheric pressure causing the fluid container to explode. Even a small temperature rise within the fluid container could sufficiently raise the internal pressure to present a safety hazard. However, often the situation arises when the fluid pressure within the container drops below that of atmospheric pressure. Conventional vent valves have been unable to automatically compensate for this contingency.

The prior art, including Keller, U.S. Pat. No. 3,603,343, teaches us various ways of automatically venting excess fluid pressure from within a fluid container. In addition, the prior art discloses separate venting valves, used exclusively to automatically relieve a partial vacuum within a fluid container by venting air from the atmosphere into the container until the pressure is equalized.

The Keller '343 device describes a vent valve capable of relieving excess fluid pressure from within a fluid container, by means of a complex system of springs and vent chamber balls. As internal fluid pressure would rise, the first ball valve would be displaced from its normal position and permit fluid to vent into the atmosphere, while the second ball valve which is normally in a non-blocking position, would not be moved into a blocking position until sufficient Bernoulli forces were present. Therefore, this vent valve is completely automatic in venting excess fluid pressure from within a fluid container.

However, with other prior art vent valves, in order to correct a partial vacuum situation within a fluid container, the cap must be partially unscrewed by hand, to enable air to enter the fluid container, and equalize the internal and atmospheric pressure. The disadvantage of this is that manual supervision is always required to correct this partial vacuum condition.

Since a partial vacuum is normally created when removing fluid from a closed container, there is a need for a totally automatic vent valve, which provides a dual function of relieving excess internal fluid pressure and relieving partial vacuum conditions. An object of the present invention is, therefore, to provide such dual protection.

An additional object of the invention is to provide a more simple and reliable vent valve design utilizing a single housing element and individual valve elements cooperatively providing vent protection.

It is additionally an object of the present invention to provide such a vent valve with the above-mentioned capabilities which is also relatively inexpensive to purchase and easy to install.

It is also an object of the invention to provide such a venting valve that can be utilized to provide a means for safely filling a fluid container.

Another object of the present invention is to provide a venting valve capable of operation in both a horizontal and a vertical orientation.

Yet another object of the present invention is to provide a vent valve having a plastic thin-walled construction so as to be capable of blowing away from the contents of the container in the event of fire and thereby provide the maximum amount of venting of excess internal fluid pressure to reduce the likelinood of explosion.

These and other objects of the invention will become apparent in light of the present specification.

SUMMARY OF THE INVENTION

The present invention comprises an improved vent valve apparatus for relieving interior fluid pressure from within a container for fluids by either automatically releasing a portion of the fluid from the container or automatically releasing air into the container when the fluid pressure reaches a particular level.

The apparatus comprises a valve housing which is restrainably affixed to the fluid container. The valve housing includes a lower housing portion and an upper housing portion which are operably attached to define a vent cavity. The vent cavity is in operable communication with the interior of the fluid container to describe a fluid vent conduit. A check valve element is operably disposed within the fluid vent conduit. The check valve element is disposed to operate between a closed position for sealing the fluid conduits and an open position for releasing a portion of the fluid. Vent release apertures in the upper housing portion are operably connected with vent cavity for releasing fluid or vapor from the valve housing to the atmosphere. The check valve element is biased into a closed position by a check valve biasing means until it is overcome by a particular fluid pressure exerted against the check valve element. A one-way valve element is operably positioned within the check valve element and enables the one-way passage of air from the atmosphere into the fluid container. The one-way valve element moves concurrently with the check valve element and cooperates therewith to normally seal the fluid vent conduit.

The upper and lower housing portions which comprise the valve housing are removably affixed to each other to permit separation therebetween. A threaded collar which is restrainably affixed to the upper housing portion is used to attach the upper and lower housing portions together. The lower housing portion has external threads which are threadedly received by mated fasteners on the throat of the bunghole.

In one embodiment of the invention, the lower housing portion includes internal threads for attaching a flame arrester coupling. With the coupling in place, a flame arrester can depend from the valve housing. This embodiment comprises a fill vent valve and is primarily used in both venting a fluid container and filling a fluid container. The flame arrester which normally extends inside the fluid container when the valve is in place, is a safety device commonly used to prevent the fluid container from flashing over when being filled.

The check valve element which is located in the lower housing portion of the valve housing is substantially cylindrical in shape and is operably disposed within the lower housing portion, describing a fluid vent conduit. This check valve element has a flanged shoulder at its first end and a plurality of check valve vanes extending downward to describe a branch fluid conduit therebetween. When the check valve element is in its closed position, the fluid vent conduit is blocked, preventing fluid from venting into the vent cavity. However, when the check valve element is in its open position, fluid escapes from the fluid container through the vanes and fluid conduit into the vent cavity.

The check valve element is biased into its closed position by a spring means interposed between the upper housing portion and the check valve shoulder. When the pressure within the fluid container exceeds that of the atmospheric pressure, the spring means, which is comprised of one or more helical springs, is compressed and the check valve element is actuated into its open position. When the fluid container pressure and the atmospheric pressure are equalized, the helical spring will once again force the check valve element into its closed position.

The one-way valve, which is comprised of a reed valve element is operably positioned within the check valve element and describes a vent passageway therein between the fluid container and the vent cavity. The reed valve element is comprised of a resilient plastic material, which in a preferred embodiment is silicon based. The reed valve element is comprised of a flanged first end, a second end substantially tapering from the first end and a flexible orifice at the base of the second end. When the pressure within the fluid container drops below that of the atmospheric pressure, and a partial vacuum situation is created, the flexible orifice at the base of the reed valve element will partially open allowing air from the atmosphere to vent into the fluid container. Once the atmospheric pressure and the fluid container pressure are equalized, the flexible orifice will return to its normally closed position, thereby preventing any air from venting into the fluid container.

The reed valve element and check valve element cooperate with one another to provide venting protection when the fluid pressure within the fluid container exceeds that of the atmospheric pressure and when the fluid pressure within the fluid container falls below that of the atmospheric pressure.

The check valve element is biased downward in a sealed position with respect to the plastic construction embodiment, as previously explained, by spring means. In addition, the reed valve is interposed between the interior of the check valve element and a second spring means. The top ends of both spring means are received within the thin-walled top of the upper housing. The thin-walled plastic construction enables melting and blowing away of the valve housing from the interior of the container in the event of fire, to provide maximum venting and perhaps avoid the explosion of the contents.

BRIEF DESCRIPTION OF THE DRAWING

FIG. 1 of the drawings is a front elevational schematic view showing particularly means for attaching the fill vent valve to the throat of the bunghole and means for providing flame prevention;

FIG. 2 is a top view of the cap of the fill vent valve showing particularly means for venting fluid into the atmosphere;

FIG. 3 is a cross-sectional view of the fill vent valve showing means for removing excess internal pressure and correcting partial internal vacuum situations, by a combination check valve element and reed valve element biased between the upper and lower housing portions;

FIG. 4 is a cross-sectional view of the check valve element depicting the check valve element legs and branch fluid conduits described therein;

FIG. 5 is a bottom view of the check valve element again indicating the relative position of the check valve element legs and branch fluid conduits;

DETAILED DESCRIPTION OF THE DRAWINGS

Figure 6:
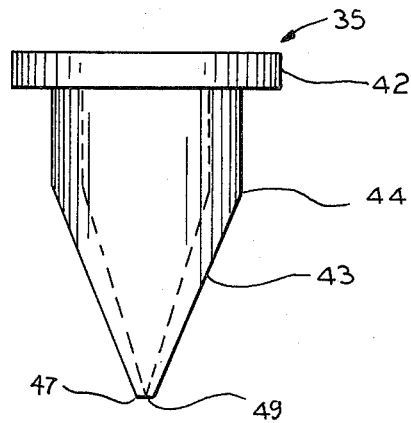
FIG. 6 is a front elevational side view of the reed valve element showing its flanged upper end and its tapered second end.

While this invention is susceptible of embodiment in many different forms, those shown in the drawings will herein be described in detail, with the understanding that the present disclosure is to be considered as an exemplification of principals of the invention and is not intended to limit the invention to the embodiments illustrated.

A preferred embodiment of the invention is shown in FIG. 1 where fill vent valve 10 comprises an upper housing portion 11, a lower housing portion 12 and a flame arrestor 13. The upper housing portion 11 comprises a cap 14 having multiple fluid release apertures 16 located around the circumference. Located on the top of cap 14 is a knob 17 to which S-clip 18 is secured. Attached to S-clip 18 is a sash chain 19 which extends downward to the lower housing portion 12 and terminates at connecting ring 21 and rivet 22. Therefore, when upper housing portion 11 is separated from lower housing portion 12 the two portions are maintained in close proximity to one another. Threaded collar 23 is threadedly associated with upper housing portion 11 and lower housing portion 12.

The lower housing portion 12 is comprised of lower external threads 24 which are threadedly received by mated fasteners on the throat of a bunghole. A bunghole is an opening on a fluid container, which is not pictured, to which fill vent valve 10 attaches. Attached within and located immediately below the lower housing portion 12 is flame arrester 13.

The top view of cap 14 shown in FIG. 2, shows the fluid apertures 16 evenly spaced around the circumference of cap 14. The fluid apertures 16 provide means for fluid or vapor located in vent cavity 26 to escape to the atmosphere. FIG. 2 also shows that knob 17 is circular and located in the center of cap 14.

The cross-sectional view in FIG. 3 shows that cap 14 is threadedly received by threaded collar 23. Located within vent cavity 26 is helical pressure relief spring 27 which is biased between heel 28 of cap 14 and check valve element 29. Check valve element 29 which is operably disposed within lower housing portion 12 is substantially cylindrical in shape and comprises a check valve shoulder 31 and a plurality of check valve element vanes 32 extending downward. Located between the check valve element vanes 32 are branch fluid conduits 33 which extend from the check valve shoulder 31 to the foot 34 to check valve element vanes 32.

Restrainably affixed within check valve element 29 is the reed valve element 35. Reed valve element 35 is sealingly biased within check valve element 29 and prevents fluid or vapor from escaping from the fluid container into vent cavity 26. This particular embodiment shows reed valve element being held in place by interference fit with both spring 27 and check valve element 29, though other similar methods of sealingly affixing reed valve element 35 to the interior of check valve element 29, should be considered as being within the scope of this invention. Also, when the check valve element 29 is in a closed position, an O-ring 36 is biased between check valve shoulder 31 and ledge 37. The O-ring 36 seals the multiple branch fluid conduits 33 thus preventing fluid from escaping from the fluid container into vent cavity 26. When the check valve element 29 is in its open position, the branch fluid conduit 33 extends beyond ledge 37 thus permitting fluid or vapor to escape from the fluid container into vent cavity 26.

Flame arrester adapter 38 is secured to the lower housing portion 12 by threadedly attaching to lower internal threads 39 of lower housing portion 12. Flame arrester 13 depends from lip 41 and is placed into the bunghole of the fluid container.

FIG. 4 is a cross-sectional view of check valve element 29 clearly showing the rectangular branch fluid conduits 33 located between check valve element vanes 32.

As can be seen on the bottom view of the check valve element 29 in FIG. 5, the check valve element vanes 32 are located around the circumference of the inner edge of the check valve element 29. The relative size of branch fluid conduit 33 to the check valve element vanes 32 can readily be seen.

Figure 7:
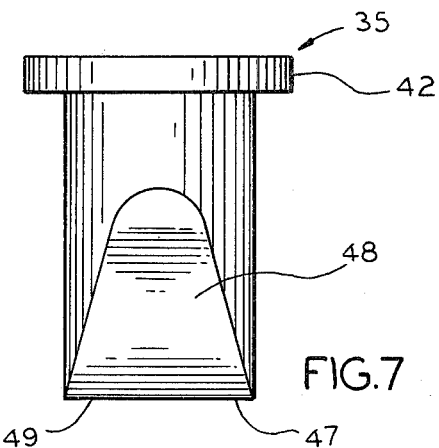
FIG. 7 is a front elevational view of the reed valve element depicted in FIG. 6 rotated 90 degrees indicating a hyperbolic pattern present on its tapered side.
Figure 8:
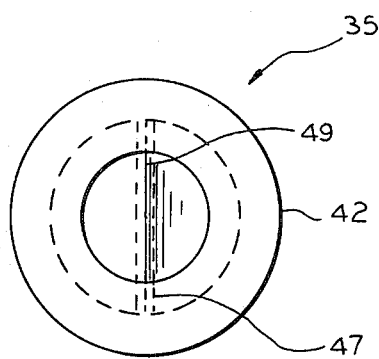
FIG. 8 is a bottom view of the reed valve element showing the flexible orifice located at its base.

FIG. 6 is a front elevational of the reed valve element 35 and shows reed valve shoulder 42. The reed valve element has a tapered second end 43 which is tapered from its mid-point 44, at approximately a 70 degree angle from normal. The reed valve element 35 can be seen to be hollow and have a flexible orifice 49 located at its base 47. The substantially cylindrical shape of the reed valve element 35 accounts for the hyperboloid pattern 48 which is a result of the forming of the tapered second end 43, shown in FIG. 7. The second end tapers to form narrow base 47 which comprises a flexible orifice 49. FIG. 8 shows that flexible orifice 49 does not run the entire length of narrow base 47, but only extends across the inside diameter of the hollow portion of the reed valve shoulder 42.

Vacuum relief means are provided by valve 10 to enable air to enter the drum if the air pressure outside the drum is greater than the internal pressure. Specifically, reed valve member 35 serves as a uni-directional passageway for the flow of air downward through its interior, as viewed in FIG. 3, while not permitting corresponding upward exit of said air. Reed valve element 35 moves concurrently and cooperates with check valve element 29 to prevent undesired venting of the interior of the container.

Pressure relief means are provided for automatic use when there is excessive pressure within the drum as compared to atmospheric pressure. This is shown in FIG. 3 as check valve assembly 30. Pressure relief spring 27 serves to normally maintain check valve shoulder 31 against O-ring 36 which in turn is sealably affixed to ledge 37. Thus, when there is a pressure differential between the interior of the drum and the atmosphere such that the pressure in the drum is higher than in vent cavity 26, by an amount sufficient to force the check valve assembly 30 to move upwards with respect to ledge 37, this allows vapors from within the drum to pass into vent cavity 26 and through apertures 16 to the atmosphere. If there were no way for these vapors to be relieved to atmosphere, then an explosion would in all probability occur.

Figure 9:
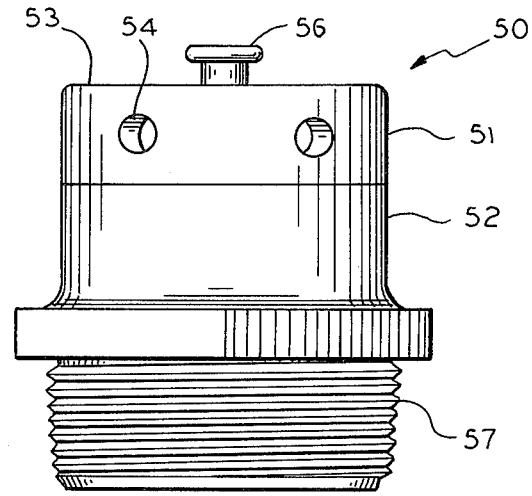
FIG. 9 is a front elevational schematic view of the drum vent valve showing means for attachment to the throat of the bunghole and indicating generally the valve housing.

Another preferred embodiment of the invention is shown in FIG. 9, is drum vent valve 50. It is comprised of an upper housing portion 51 and a lower housing portion 52. The upper housing portion 51 includes a cap 53 having multiple fluid apertures 54. Also, located on the top of cap 53 is a knob 56.

The lower housing portion 52 has lower external threads 57 which are threadedly received by mated fasteners on the throat of the bunghole.

Figure 10:
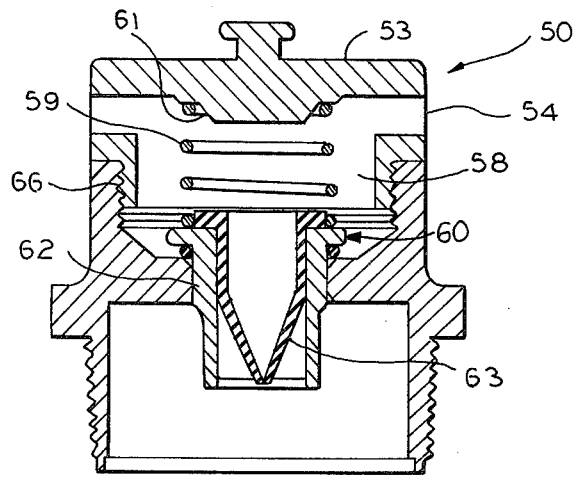
FIG. 10 is a cross-sectional view of the drum vent valve showing means for relieving excess internal pressure and relieving partial vacuum situations by means of a check valve element and reed valve element operably disposed within the lower housing portion.

FIG. 10 is a cross-sectional view of drum vent valve 50 and shows the cap 53 threadedly received by the lower housing portion 52. Described between the upper and lower housing portions is a vent cavity 58 into which flows fluid or vapor escaping from the fluid container. Located within vent cavity 58 is a helical pressure relief spring 59 which is biased between the heel 61 of cap 53 and the check valve element 62. Sealingly biased within check valve element 62 is reed valve element 63. Both of these components are operably disposed within the drum vent valve 50 in a similar manner as described above for the fill vent valve 10.

Figure 11:
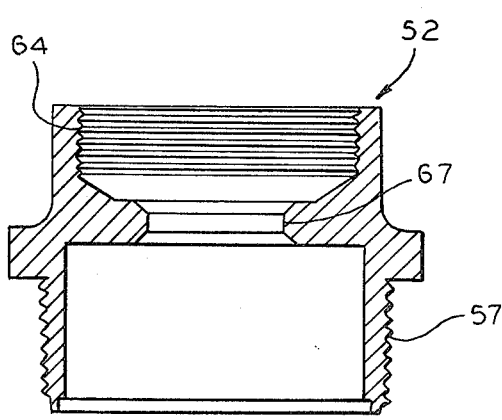
FIG. 11 shows the lower housing portion with the upper housing portion, check valve element and reed valve element removed.

FIG. 11 is a cross-sectional view of the lower housing portion 52 with the upper housing portion 51, helical pressure relief spring 59, check valve element 62, and reed valve element 63 removed. The upper internal threads 64 are matedly fastened to the lower mating threads 66 of cap 53, shown in FIG. 10. The check valve element 62 is operably disposed within throat 67 cooperating with reed valve element 63 effectively limiting the flow of fluid from the fluid container into the vent cavity 58, while allowing air to vent into the fluid container when a partial vacuum condition exists.

In this particular embodiment, the reed valve element 63 and the check valve element 62 cooperate to provide effective dual protection from excess internal pressure and partial vacuum conditions within a fluid container.

Drum vent valve 50 is totally automatic and uses a minimum of moving parts.

More particularly, vacuum relief means are provided in valve embodiment 50 shown in FIGS. 9, 10 and 11. In order to enable air to enter the drum if air pressure outside the drum is greater than the internal pressure, reed valve member 63 serves as a uni-directional passageway for downward flow of air, as viewed in FIG. 10, while not permitting corresponding upward exit of said air therethrough.

In addition, pressure relief means shown in FIG. 10 as check valve assembly 60 are provided for automatic use when there is excessive pressure within the drum as compared to atmospheric pressure.

As previously described for valve 10, pressure relief spring 59 serves to normally maintain check valve 60 in a seated and closed position. However, when there exists a pressure differential between the interior of the drum and the atmosphere such that the pressure in the drum is higher than that in vent cavity 58, by an amount sufficient to force the check valve assembly 60 to move upwards with respect to lower housing portion 52, this allows vapors from within the drum to pass into vent cavity 58 and through ports 54 to the atmosphere.

Figure 12:
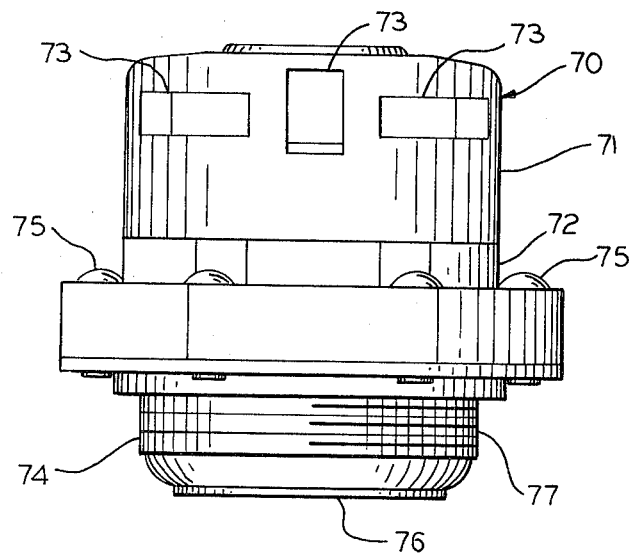
FIG. 12 is a front elevational schematic view of the embodiment of the drum vent valve having the plastic construction and corresponding blow-away feature showing means for attachment to the throat of the bunghole and indicating generally the valve housing.
Figure 13:
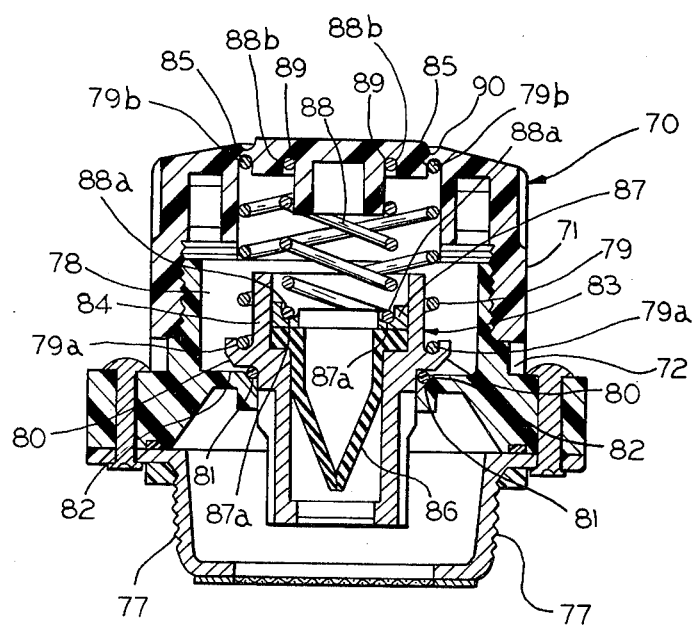
FIG. 13 is a cross-sectional view of the drum vent valve plastic construction embodiment showing means for relieving excess internal pressure and relieving partial vacuum situations by means of a check valve element and reed valve element operably disposed within a lower housing portion.
Figure 14:
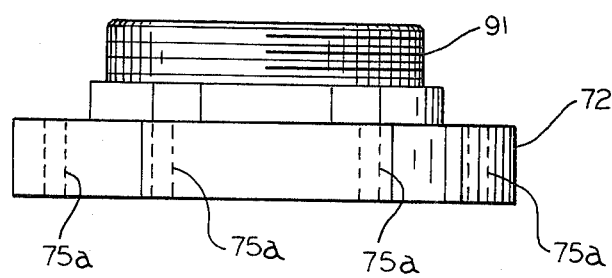
FIG. 14 is a front elevational view of the lower housing portion of the plastic construction embodiment with the upper housing portion and lower threaded vent adapter member removed.

The plastic construction embodiment 70 of the present invention is illustrated in FIGS. 12, 13, and 14. Shown in FIG. 12 are upper housing portion 71 and lower housing portion 72. Upper housing portion 71 includes numerous ports 73 situated about its periphery. Furthermore, lower housing portion 72 is operably affixed to lower threaded vent adapter member 74 by fasteners 75. External threads 77 of vent adapter member 74 are threadedly received by corresponding threads on the throat of a drum bunghole.

Shown in FIG. 12 is flame arrester 76 consisting of a circular screen or meshed sheet metal member affixed to the bottom of vent adapter member 74. Flame arrester 76 prevents any flash fires that may occur from flames spreading either from the interior of the drum to the exterior thereof or in the opposite direction. It has been found that vapors pass readily through the screen, but flames do not, thereby lessening the possibility of explosion.

A cross-sectional view of the interior of plastic construction embodiment 70 appears in FIG. 13. Upper housing portion 71 is shown threadedly engaged to lower housing portion 72. Described between upper and lower housing portions is vent cavity 78 into which flows fluid or vapor escaping from the drum. Enclosed within vent cavity 78 is pressure relief spring 79, the lower end of which, 79a, abuts shoulders 80 of check valve assembly 83 so as to bias check valve element 84 into sealable contact with O-ring 81, which in turn contacts ledge 82 of lower housing unit 72, so as to prevent the passage of fluid or vapor from the interior of said drum to the ports 73 and eventually into the atmosphere, in the absence of pressure within the drum sufficient to overcome the downward biasing force of spring 79. If said spring force is overcome, the air and fluid-tight seal between shoulders 80 of check valve assembly 83 and O-ring 81 will be broken, so as to allow passage of fluid or vapor therebetween. Check valve element 84 has a construction and operation such as that described for check valve elements 62 and 29 of embodiments 50 and 10, respectively. The upper end 79b of pressure relief spring 79 is situated within groove 85 of upper housing portion 71.

As also shown in FIG. 13, reed valve element 86, of the type previously described in connection with fill vent valve 10 and drum vent valve 50 (and shown in FIGS. 3, 6, 7, 8, 9, and 10) is restrainably affixed within check valve element 84 by reed valve collar 87 and in turn by reed valve spring 88. In particular, reed valve spring 88 interposed between upper housing member 71 and collar member 87, serves to bias the latter downward, and therefore interpose and restrain reed valve element 86 between said collar 87 and check valve element 84. The lower ends 88a of spring 88, when viewed as in FIG. 13, are received by groove 87a in collar 87, while the upper ends 88b of spring 88 are situated within groove 89 in upper housing member 71.

The foregoing structure provides for vacuum relief means within valve embodiment 70, illustrated in FIGS. 11, 12 and 13. In order to enable air to enter the drum or fluid container in the event that outside air pressure is greater than the internal pressure, reed valve member 86 serves as a uni-directional passageway for downward (as viewed in FIG. 12) flow of air, through its interior, while not permitting corresponding upward exit of said air through its interior.

Pressure relief means are also provided for automatic use in the event that there is excessive pressure within the drum or fluid container as compared to atmospheric pressure. This is shown in FIG. 13 as check valve assembly 83.

As previously described for valves 10 and 50, springs 79 and 88 serve to normally maintain check valve assembly shoulder 80 against O-ring 81 which in turn is sealably positioned upon ledge 82. Thus, when there is a pressure differential between the interior of the drum or fluid container and the atmosphere, such that the pressure in the drum is higher than in vent cavity 78, by an amount sufficient to force the check valve assembly 84 to move upwards with respect to lower housing 72, this will allow vapors from within the drum to pass ultimately into vent cavity 78, through ports 73 and ultimately into the atmosphere.

This embodiment of valve 70 further includes a construction wherein upper housing 71 is formed from plastic material such as high density polyethylene having a thin-walled construction at cap portion 90. This particular construction results in a device which in a fire situation, would first vent the interior of the fluid container as previously described and then break away at the thin-walled cap portion 90 when excessive pressures are created upon check valve assembly 83 by the contents of fluid container, so as to provide maximum venting of said contents and thereby diminish the probability of explosion. Also, a plastic construction of valve embodiment 70, results in a device that will melt after partially breaking away from the drum or fluid container, so as to continue to provide additional venting of the contents and lessen the likelihood of explosion. Internal pressure of the fluid container contents keeps the melting plastic portions of this device away from the fluid container portions while burning.

Furthermore, the above-described construction allows for use of the invention in both a horizontal and a vertical orientation.

Finally, FIG. 14 shows lower housing portion 72 and in particular, external threaded portion 91 and fastener apertures 75a formed therethrough.

The foregoing description and drawings merely explain and illustrate the invention and the invention is not limited thereto, except insofar as the appended claims are so limited, as those skilled in the art who have the disclosure before them will be able to make modifications and variations therein without departing from the spirit and scope of the invention.

What is claimed is:

1. A vent valve apparatus for relieving interior fluid or vapor pressure from within a container for fluids by automatically releasing a portion of said fluid or vapors from said container, or relieving partial vacuum from within said container by automatically releasing air into said container, said apparatus including valve housing means restrainably affixed to said container;

said valve housing means including an upper housing portion and a lower housing portion;

said upper housing portion operably attached to said lower housing portion to describe a vent cavity;

said vent cavity being in operable communication with the interior of said container to describe a vent conduit;

check valve element means operably disposed within said vent conduit;

said check valve element means operably disposed between a closed position sealing said vent conduit and an open position for releasing said portion of fluid or vapor through said vent conduit into said vent cavity, vent release apertures in said upper housing means in operable connection with said vent cavity for releasing said portion of fluid or vapor from said housing means to the atmosphere;

said check valve element means being biased into its closed position by check valve biasing means;

said check valve biasing means serving to maintain said check valve element in said closed position until overcome by a particular fluid or vapor pressure exerted against said check valve element means so as to move said check valve element to the open position; and one-way valve element means positioned in said apparatus to enable one-way passage of air from the atmosphere to the interior of said container, the improvement comprising:

said one-way valve element operably affixed to the interior of said check valve element so as to prevent passage of liquid or vapor to the atmosphere from the interior of said container when said check valve element is in said closed position;

said one-way valve element allowing communication between said container interior and the atmosphere whenever said interior container pressure falls below atmospheric pressure so as to alleviate the partial vacuum therein;

said check valve element and said one-way valve element operating to automatically vent said container or allow passage of air into the interior of said container whether said apparatus is in a horizontal or vertical orientation;

said upper housing portion comprising a top part and a bottom part, said top part having a thin-walled construction, said thin-walled top part being shaped so as to receive said check valve biasing means, and serving to break away from said container in response to the exertion of excessive force by said check valve element means and in turn said check valve biasing means thereon, so as to provide increased venting of said container interior; and said valve housing means comprising a plastic material such as high density polyethylene, to provide eventual melting of said housing means in the event of fire and thereby provide maximum venting of the contents of said container.

2. The apparatus according to claim 1, wherein the lower housing portion includes means for attaching flame arrester means thereto, said means comprising internal threads for attaching a flame arrester coupling.

3. The apparatus according to claim 1, wherein flame arrester means are operably affixed to said lower housing portion so as to be interposed between the contents of said container and said vent valve.

4. The apparatus according to claim 1, wherein said check valve element means comprises:

a substantially hollow cylindrically shaped element operably disposed within said fluid vent conduit;

said check valve element having a plurality of vane means positioned about its periphery and extending below said fluid vent conduit when in said closed position; and said vane means being situated within said fluid vent conduit when in the open position so as to allow flow of vapor or fluid therebetween to said vent cavity.

5. The apparatus according to claim 1, wherein said biasing means comprises one or more coiled helical springs interposed between said upper housing portion and said check valve element.

6. The apparatus according to claim 1 wherein said one-way valve element comprises:

a reed valve element;

said reed valve element describing a vent passageway having a flanged first end and a second end tapering from said first end;

said vent passageway having a flexible orifice at said second end;

said reed valve element being sealably affixed within the interior of said check valve element means so as to prevent the release of said vapor or fluid from said interior of said container through said check valve element interior; and said reed valve element enabling passage of air from said vent cavity to said container interior when said fluid or vapor pressure falls below the atmospheric pressure so as to alleviate the partial vacuum formed within said container interior.

7. A vent valve apparatus for relieving interior fluid or vapor pressure from within a container for fluids by automatically releasing a portion of said fluid or vapors from said container, or relieving partial vacuum from within said container by automatically releasing air into said container, said apparatus including valve housing means restrainably affixed to said container;

said valve housing means including an upper housing portion and a lower housing portion, said upper housing portion operably attached to said lower housing portion to describe a vent cavity;

said vent cavity being in operable communication with the interior of said container to describe a vent conduit;

check valve element means operably disposed within said vent conduit;

said check valve element means operably disposed between a closed position sealing said vent conduit and an open position for releasing said portion of fluid or vapor through said vent conduit into said vent cavity, vent release apertures in said upper housing means in operable connection with said vent cavity for releasing said portion of fluid or vapor from said housing means to the atmosphere;

said check valve element means being biased into its closed position by check valve biasing means;

said check valve biasing means serving to maintain said check valve element in said closed position until overcome by a particular fluid or vapor pressure exerted against said check valve element means so as to move said check valve element to the open position; and one-way valve element means positioned in said apparatus to enable one-way passage of air from the atmosphere to the interior of said container, the improvement comprising:

said upper housing portion further comprising a top part and a bottom part, said top part having a thin-walled construction, said thin-walled top part being shaped so as to receive said check valve biasing means, and serving to break away from said container in response to the exertion of excessive force by said check valve element means and in turn said check valve biasing means thereon, so as to provide increased venting of said container interior.

8. The apparatus according to claim 7 wherein said valve housing means is of a plastic material to allow eventual melting of said device housing in the event of fire and thereby provide maximum venting of the contents of said container.

9. The apparatus according to claim 8 wherein said plastic material is high density polyethylene.

* * * * *

UNITED STATES PATENT AND TRADEMARK OFFICE
CERTIFICATE OF CORRECTION

PATENT NO. : 4,458,711
DATED : July 10, 1984
INVENTOR(S) : Frank S. Flider

It is certified that error appears in the above–identified patent and that said Letters Patent are hereby corrected as shown below:

Col. 2, line 9: "likelinood" should be --likelihood--;

Col. 6, line 29: "apertures" should be --ports--;

lines 29 and 30: Delete "to be relieved to atmosphere" and insert --under high pressure to escape--;

line 37: After "54", insert --around its circumference--;

Col. 8, line 27: "Tnis" should be --this--;

line 34: "tne" should be --the--.

Signed and Sealed this

Twenty-third Day of July 1985

[SEAL]

Attest:

DONALD J. QUIGG

Attesting Officer     Acting Commissioner of Patents and Trademarks